(12) United States Patent
Heo

(10) Patent No.: US 7,061,145 B2
(45) Date of Patent: Jun. 13, 2006

(54) APPARATUS FOR FIXING STATOR OF RECIPROCATING COMPRESSOR

(75) Inventor: Jung-Wan Heo, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/023,444

(22) Filed: Dec. 29, 2004

(65) Prior Publication Data

US 2005/0140217 A1    Jun. 30, 2005

(30) Foreign Application Priority Data

Dec. 31, 2003    (KR) .................. 10-2003-0102286

(51) Int. Cl.
*H02K 35/00*    (2006.01)

(52) U.S. Cl. ........................... 310/15; 310/12

(58) Field of Classification Search ........... 310/12–15, 310/17; 417/363, 417
See application file for complete search history.

(56) References Cited

U.S. PATENT DOCUMENTS

| 6,097,125 A * | 8/2000 | Park et al. ............. 310/156.45 |
| 6,838,789 B1 * | 1/2005 | Kwon et al. ................. 310/12 |
| 2003/0129069 A1 * | 7/2003 | Bae et al. .................. 417/363 |

FOREIGN PATENT DOCUMENTS

KR    1998-0066270    10/1998

* cited by examiner

*Primary Examiner*—Thanh Lam
(74) *Attorney, Agent, or Firm*—Birch, Stewart, Kolasch & Birch, LLP

(57) ABSTRACT

An apparatus for fixing a stator of a reciprocating compressor includes: a frame fixedly installed in a case; a cylinder penetratingly inserted and coupled to the frame; a piston inserted in the cylinder and having a suction passage for sucking a refrigerant therein; an outer stator contacting with and supported by the frame; an inner stator formed as a cylindrical shape by laminating a plurality of lamination sheets forming ring grooves at both side surfaces thereof and inserted upon an outer circumference surface of the cylinder or the frame so as to form a certain interval from an inner diameter of the outer stator; at least one fixing ring having a ring shape inserted into the ring grooves; and at least one protrusion portion protruding formed around the center of the lamination sheets and pressed on an outer circumference surface of the cylinder.

Accordingly, both inner diameters of the inner stator can be prevented from being narrowed when pressingly inserting the fixing ring into both sides of the inner stator, whereby abrasions between the cylinder and the piston can be prevented from occurring when the inner diameter of the cylinder becomes narrow when the inner stator is pressingly inserted upon the cylinder.

10 Claims, 4 Drawing Sheets

APPARATUS FOR FIXING STATOR OF RECIPROCATING COMPRESSOR

BACKGROUND OF THE INVENTION

1. Field of the Invention

The present invention relates to a reciprocating compressor, and more particularly, to a reciprocating compressor capable of not only firmly coupling a stator of a motor with other parts but also preventing abrasions and distortions with other adjacent parts during the assembly.

2. Description of the Background Art

In general, a compressor converts electric energy into kinetic energy, and compresses a refrigerant by the kinetic energy. The compressor is the kernel of a freezing cycle system, and according to compression mechanisms, there are various kinds of compressors such as a rotary compressor, a scroll compressor, a reciprocating compressor and the like.

The reciprocating compressor is classified into one using a method for compressing a gas by converting a rotary force of a rotary motor for generating a rotary force into linear reciprocation and the other using a method for compressing a gas by a linearly reciprocating driving force of a linear motor for generating a linearly reciprocating driving force.

The reciprocating compressor using the linear motor includes: a frame; a linear motor for generating the linearly reciprocating driving force upon receiving the power; a compression unit for compressing a gas upon receiving the linearly reciprocating driving force of the linear motor; a resonance unit for resonating movement of the compression unit; and a valve unit for controlling gas flow.

The linear motor includes: an outer stator; an inner stator inserted into the outer stator; and a mover movably inserted between the outer stator and the inner stator.

The outer stator and the inner stator are formed as a cylindrical shape, respectively, and the outer stator and the inner stator are lamination bodies that in order to minimize loss of flux, a plurality of lamination sheets having a predetermined shape are radially laminated towards the center of the cylindrical shape so that the lamination sheets can make the cylindrical shape.

In general, the outer stator and the inner stator are fixedly coupled with the frame. The inner stator is constructed as the lamination body by radially laminating a plurality of lamination sheets having the predetermined shape so as to form the cylindrical shape whose inner circumference surface makes a circle and whose inside is empty. Thereafter, a plurality of lamination sheets constituting the lamination body are fixed, and by penetrating the center of the fixed lamination body, the lamination body is fixedly coupled with the frame or an outer circumference surface of the cylinder. Such a process of fixing and coupling the lamination sheets significantly affects efficiency of the motor.

Particularly, since an interval between the outer stator and the inner stator constituting the linear motor influences efficiency of the linear motor, the outer stator and the inner stator should be precisely coupled with each other so as to minimize the interval there between. In addition, since force applies at the lamination sheets constituting the lamination bodies when flux flows between the outer stator and the inner stator, the lamination sheets should be firmly fixed. If the outer stator and the inner stator are not firmly fixed but separated from each other in a state that the lamination sheets are coupled to each other, the outer stator and the inner stator will collide with the mover inserted between the outer stator and the inner stator, thereby causing damages to parts.

SUMMARY OF THE INVENTION

Therefore, an object of the present invention is to provide an apparatus for fixing a stator of a reciprocating compressor capable of not only firmly coupling a stator of a motor with other parts but also preventing abrasions and distortions with other adjacent parts during the assembly.

To achieve these and other advantages and in accordance with the purpose of the present invention, as embodied and broadly described herein, there is provided an apparatus for fixing a stator of a reciprocating compressor, comprising: a frame fixedly installed in a case; a cylinder penetratingly inserted and coupled to the frame; a piston inserted in the cylinder and having a suction passage for sucking a refrigerant therein; an outer stator contacting with and supported by the frame; an inner stator formed as a cylindrical shape by laminating a plurality of lamination sheets forming ring grooves at both side surfaces thereof and inserted upon an outer circumference surface of the cylinder or the frame so as to form a certain interval from an inner diameter of the outer stator; at least one fixing ring having a ring shape inserted into the ring groove; and at least one protrusion portion protruding formed around the center of the lamination sheets and pressed on an outer circumference surface of the cylinder.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, reference will now be made in detail to the preferred embodiments of an apparatus for fixing a stator of a reciprocating compressor of the present invention, examples of which are illustrated in the accompanying drawings.

Figure 1:
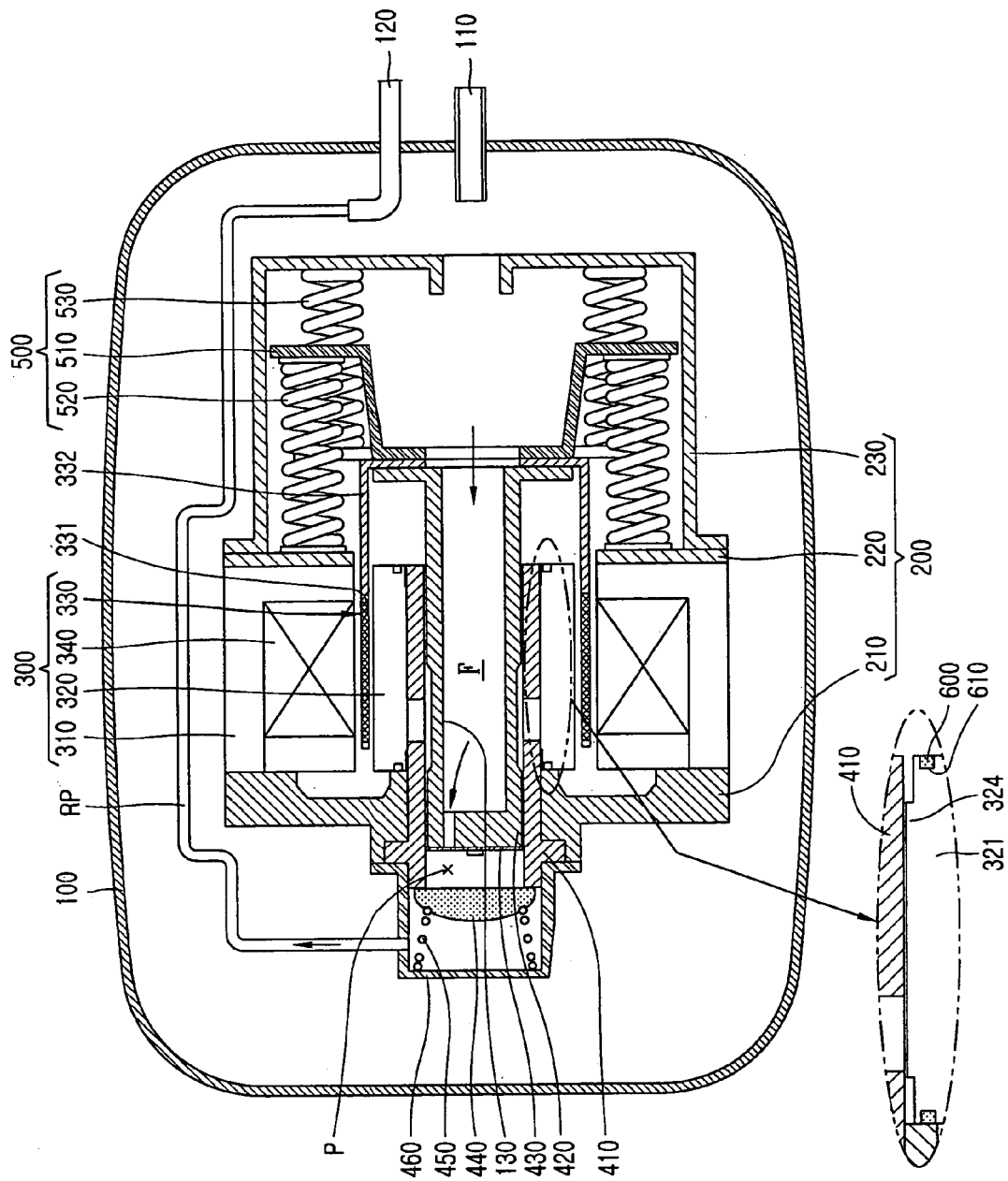
FIG. 1 is a cross-sectional view showing a reciprocating compressor provided with a first embodiment of the present invention.

FIG. 1 is a cross-sectional view showing a reciprocating compressor provided with a first embodiment of the present invention.

As shown therein, the reciprocating compressor includes: a casing 100 provided with a suction pipe 110 and a discharge pipe 120; a frame unit 200 positioned inside the casing 100; a motor 300 mounted at the frame unit 200 and generating a linearly reciprocating driving force; a compression unit 400 for compressing a gas upon receiving the driving force of the motor 300; and a resonance spring unit 500 for resonating the driving force of the motor 300.

The frame unit 200 includes: a front frame 210 supporting one side of the motor 300 and coupled with the compression unit 400 therein; a middle frame 220 supporting the other side of the motor 300, leaving a certain interval from the front frame 210; and a rear frame 230 coupled with the middle frame 220 and having the resonance spring unit 500 positioned therein.

The motor 300 includes: an outer stator 310 fixed between the front frame 210 and the middle frame 230; an inner stator 320 inserted into the outer stator 310 at a certain interval; a mover 330 movably inserted between the outer stator 310 and the inner stator 320; and a winding coil 340 fixed in the outer stator 310. The mover 330 includes a magnet 331 and a magnet holder 332 for supporting the magnet 331.

The inner stator 320 is formed by laminating a plurality of lamination sheets 321 as a cylindrical shape and inserting the laminated lamination sheets upon an outer circumference surface of a cylinder 410 by pressingly inserting fixing rings 600 having a ring shape into ring grooves 322 formed at both sides.

The compression unit 400 includes: a cylinder 410 inserted between the front frame 210 and the inner stator 320 and fixedly coupled there between; a piston 420 movably inserted into the cylinder 410, forming a compression chamber (P) in which a refrigerant is compressed, and having a suction passage 130 for sucking the refrigerant thereinto; and a valve system coupled with the piston 420 and the cylinder 410.

The resonance spring unit 500 includes: a spring support 510 coupled with a connection portion of the mover 330 and the piston 420; a front resonance spring 520 for supporting the front on the basis of the spring support 510; and a rear resonance spring 530 for supporting the rear of the spring support 510.

The valve system includes: a discharge cover 460 mounted at one side of the front frame 210 and covering the compression chamber (P) of the cylinder; a discharge valve 440 positioned in the discharge cover 460 and opening or closing the compression chamber (P) of the cylinder 410; a discharge spring 450 positioned in the discharge cover 460 and supporting the discharge valve 440; and a suction valve 430 mounted at an end portion of the piston 420 and controlling flow of the refrigerant sucked into the compression chamber (P) of the cylinder.

Undescribed reference marks RP refers to a loop pipe.

Figure 2:
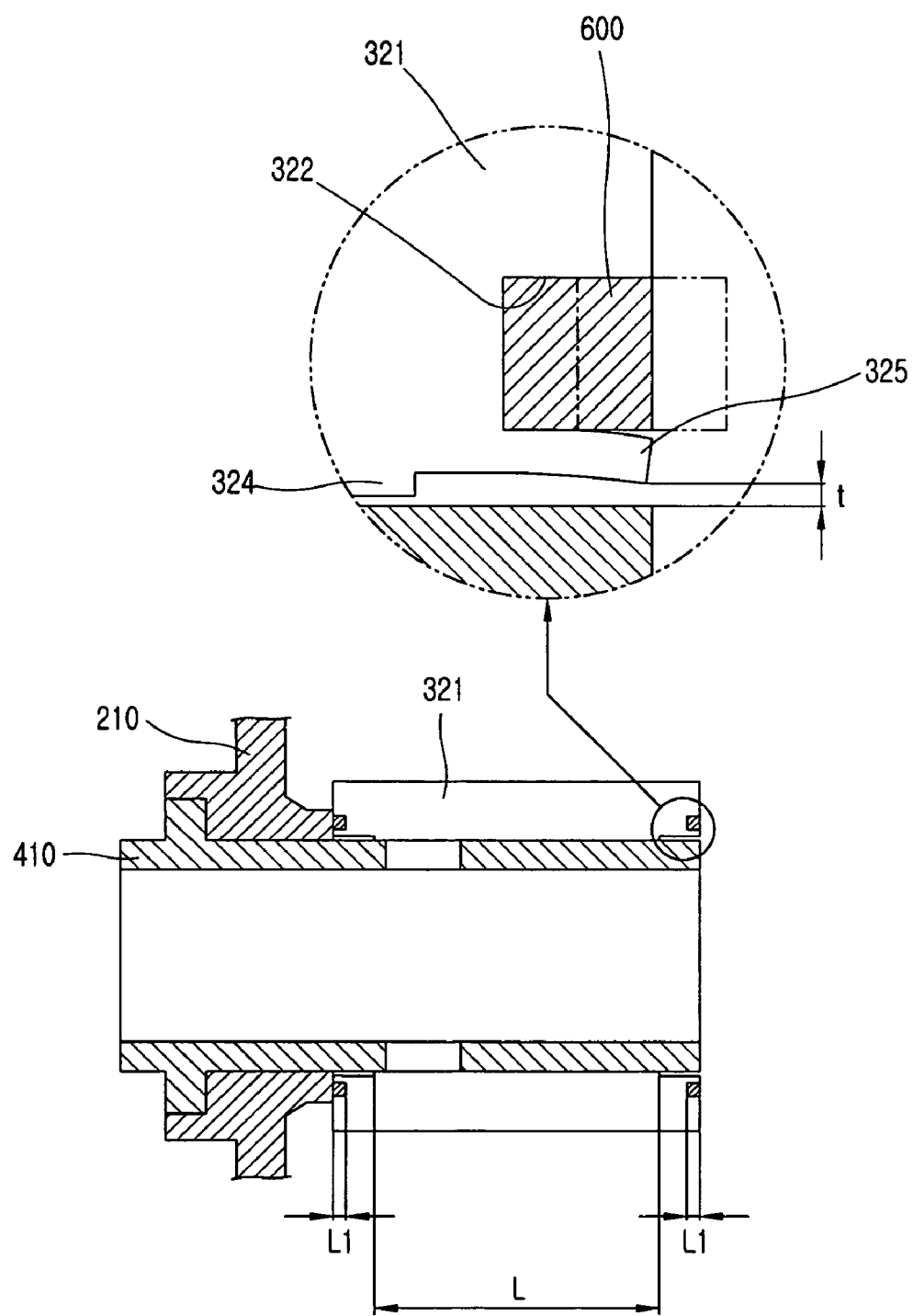
FIG. 2 is a schematic view showing a process of inserting an inner stator of the reciprocating compressor of the present invention.

FIG. 2 is a schematic view showing a process of inserting an inner stator of the reciprocating compressor of the present invention.

As shown therein, the inner stator 320 includes at least one protrusion portion 324 protruding formed around the center and pressed on the outer circumference surface of the cylinder 410.

The length (L) of the protrusion portion 324 is preferably formed not to overlap with the width (L1) of the ring groove 322, that is, the protrusion portion 324 is formed to be positioned between the both ring grooves 322. Though a peripheral portion 325 around the ring groove 322 is inclined to be opened, such a construction makes a free margin (t) maintained between both corners and the cylinder 410.

Figure 3:
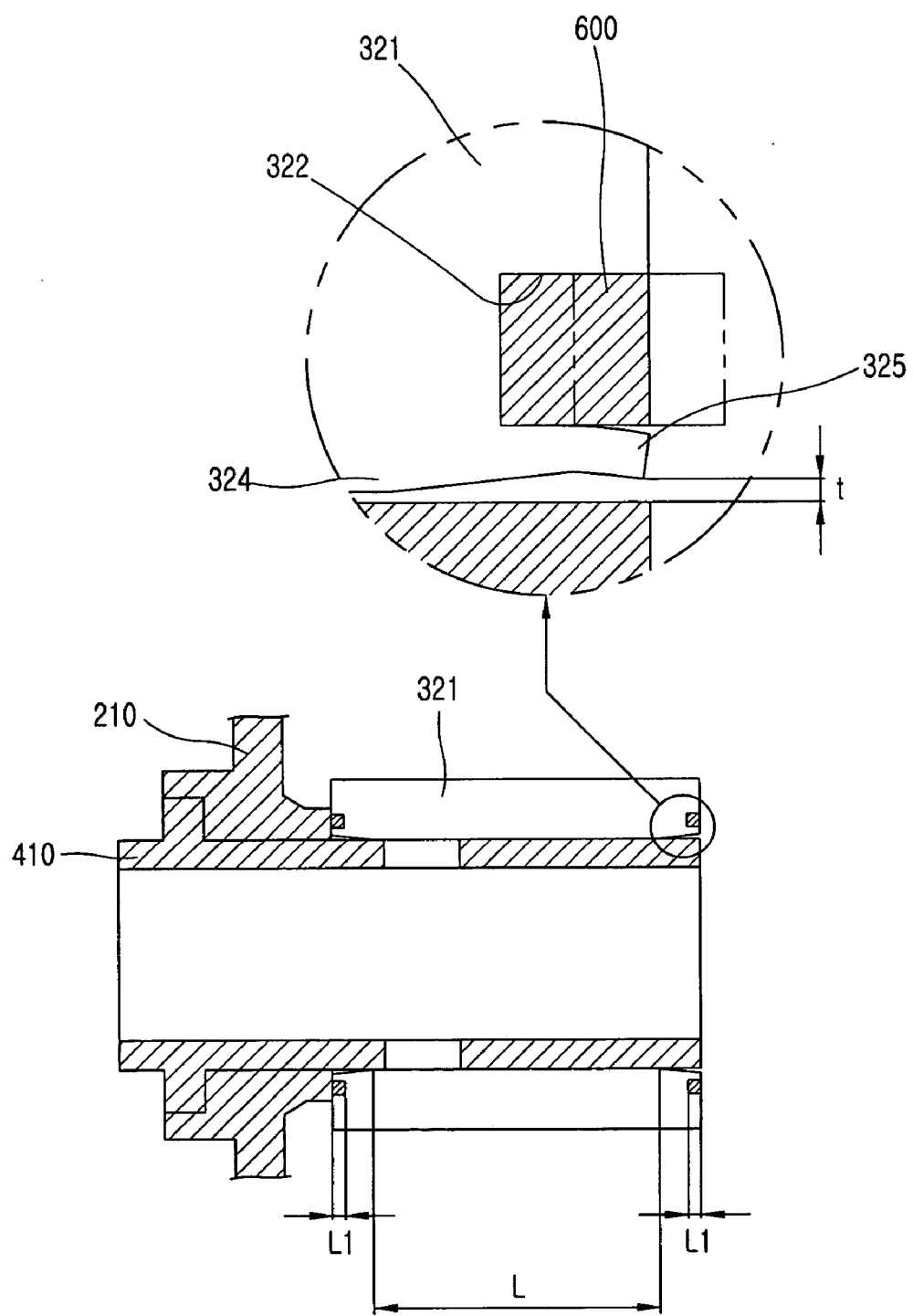
FIG. 3 is a cross-sectional view showing a second embodiment in accordance with the present invention.

FIG. 3 is a cross-sectional view showing a second embodiment in accordance with the present invention.

As shown therein, the protrusion 324 is inclined at a predetermined angle from its both ends to both ends of the lamination sheets 321.

Operational effects of the reciprocating compressor of the present invention is described as follows.

When the power is applied to the outer stator 310 of the motor 300, flux is generated between the outer stator 310 and the inner stator 320, and thus the mover 330 and the piston 420 move together according to a direction of the flux. At the same time, the piston 420 linearly reciprocates in the cylinder 410 by the resonance spring unit 500 to thereby generate the pressure difference in the compression chamber (P) of the cylinder 410. Accordingly, the refrigerant is sucked into the compression chamber (P) through the suction passage 130, compressed to a certain pressure, and is discharged. Such processes are repeated.

Herein, as described above, the inner stator 320 is formed in a such a manner that a plurality of lamination sheets 321 are radially laminated, are formed as a cylindrical shape by pressingly inserting the fixing rings 600 into the ring grooves 322 at both side surfaces thereof, and then are pressingly inserted upon and fixed to the outer circumference surface of the cylinder 410 fixed to the front frame 210. At this time, an inner diameter of the inner stator 320 should be almost identical to an outer diameter of the cylinder 410 such that the inner stator 320 can be closely coupled with the cylinder 410 and maintain the minimum air gap with the outer stator 310, whereby compressor performance can be increased.

At this time, when the inner stator 320 is assembled, by pressingly inserting the fixing rings 600 into the both side surfaces, the peripheral portion 325 around the ring groove 322 is inclined to be opened towards an inner circumference surface and therefore an actual inner diameter of the inner stator 320 gets smaller. Therefore, when pressingly inserted upon the outer circumference surface of the cylinder 410, the inner stator 320 tightens the cylinder 410. As a result, there are concerns that severe abrasions between the cylinder 410 and the piston 420 will occur. However, by forming the free margin (t) in the vicinity of the both corners of the inner stator 320 and the protrusion portion 324 in contact with the outer circumference surface of the cylinder 410 at the center of the inner stator, the inner circumference surface of the protrusion portion 324 is pressed on and fixed closely to the outer circumference surface of the cylinder when pressingly inserting the inner stator 320. Also, though the peripheral portion 325 around the ring groove 322 is inclined to be opened toward the inner circumference surface when pressingly inserting the fixing ring 600, the peripheral portion is inclined to be opened only as much as the free margin (t). Accordingly, the inner stator 320 can maintain the proper inner diameter and can be prevented from tightening the cylinder 410.

By preventing both inner diameters of the inner stator from being narrowed by the fixing rings when pressingly inserting the fixing rings into both side surfaces of the inner stator, the cylinder can maintain the proper inner diameter when the inner stator is pressingly inserted upon the cylinder, whereby abrasions between the cylinder and the piston can be prevented and therefore compressor performance can be increased.

Figure 4:
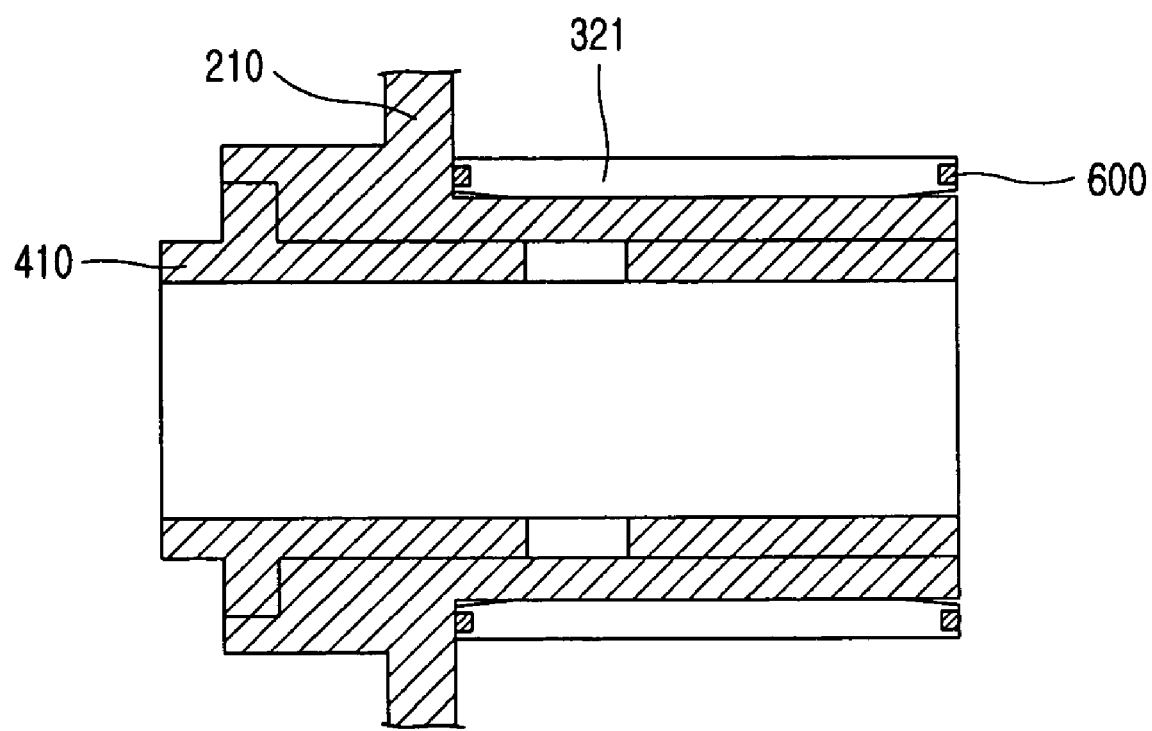
FIG. 4 is a cross-sectional view showing a third embodiment in accordance with the present invention.

FIG. 4 is a cross-sectional view showing a third embodiment in accordance with the present invention.

In the above embodiments, the inner stator 320 is inserted upon the cylinder 410. However, the following construction is also possible: the front frame 210 is expanded to the outer circumference surface of the cylinder 410 and the inner stator 320 is inserted upon the expanded front frame 210.

As so far described, in an apparatus for fixing a stator of a reciprocating compressor of the present invention, by forming a protrusion portion around the center of the inner stator and pressingly fixing the inner stator to the cylinder or the frame, both inner diameters of the inner stator can be prevented from being narrowed when pressingly inserting the fixing ring into both sides of the inner stator, whereby abrasions between the cylinder and the piston can be prevented from occurring when the inner diameter of the cylinder becomes narrow when the inner stator is pressingly inserted upon the cylinder.

In addition, as a job of fixing the inner stator constituting the motor is simplified and the constituting parts become simple, assembly productivity can be increased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for fixing a stator of a reciprocating compressor, comprising:
    a frame fixedly installed in a case;
    a cylinder penetratingly inserted and coupled to the frame;
    a piston inserted in the cylinder and having a suction passage for sucking a refrigerant therein;
    an outer stator contacting with and supported by the frame;
    an inner stator having a cylindrical shape and a plurality of lamination sheets forming ring grooves at both side surfaces thereof and inserted upon an outer circumference surface of the cylinder so as to form a certain interval from an inner diameter of the outer stator;
    at least one fixing ring having a ring shape inserted into the ring grooves; and
    the inner circumferential surface of the inner stator having at least one protrusion portion protruding formed around the center of the lamination sheets and pressed on an outer circumferenctial surface of the cylinder to form a free margin between the non-protruding portions of the inner stator and the outer circumferential surface of the cylinder adjacent the side surfaces of the inner stator.

2. The apparatus of claim 1, wherein the protrusion portion is positioned between the ring grooves.

3. The apparatus of claim 2, wherein the protrusion portion is stepped on an inner circumference of the lamination sheets.

4. The apparatus of claim 1, wherein the protrusion portion is inclined at a predetermined angle from both side surfaces thereof to both side surfaces of the lamination sheets.

5. The apparatus of claim 2, wherein the protrusion portion is inclined at a predetermined angle from both side surfaces thereof to both side surfaces of the lamination sheets.

6. An apparatus for fixing a stator of a reciprocating compressor, comprising:
    a frame fixedly installed in a case;
    a cylinder penetratingly inserted and coupled to the frame;
    a piston inserted in the cylinder and having a suction passage for sucking a refrigerant therein;
    an outer stator contacting with and supported by the frame;
    an inner stator having a cylindrical shape and a plurality of lamination sheets forming ring grooves at both side surfaces thereof and inserted upon an outer circumferential surface of the frame so as to form a certain interval from an inner diameter of the outer stator;
    at least one fixing ring having a ring shape inserted into the ring groove; and
    the inner circumferential surface of the inner stator having at least one protrusion portion protrudingly formed around the center of the lamination sheets and pressed on an outer circumferential surface of the cylinder to form a free margin between the non-protruding portions of the inner stator and the outer circumferential surface of the cylinder at the corners of the inner stator.

7. The apparatus of claim 6, wherein the protrusion portion is positioned between the ring grooves.

8. The apparatus of claim 7, wherein the protrusion portion is stepped on an inner circumference of the lamination sheets.

9. The apparatus of claim 6, wherein the protrusion portion is inclined at a predetermined angle from both side surfaces thereof to both side surfaces of the lamination sheets.

10. The apparatus of claim 7, wherein the protrusion portion is inclined at a predetermined angle from both side surfaces thereof to both side surfaces of the lamination sheets.

* * * * *